United States Patent
Marsella et al.

(10) Patent No.: US 10,756,822 B1
(45) Date of Patent: Aug. 25, 2020

(54) DIGITAL FIBER NONLINEARITY COMPENSATION

(71) Applicant: Nokia Solutions and Networks Oy, Espoo (FI)

(72) Inventors: Domenico Marsella, Villasanta (IT); Carlo Costantini, Casatenovo (IT); Luca Gabriele Razzetti, Sesto San Giovanni (IT); Giancarlo Gavioli, Arcore (IT)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/553,142

(22) Filed: Aug. 27, 2019

(51) Int. Cl.
*H04B 10/00* (2013.01)
*H04B 10/61* (2013.01)
*H04B 10/079* (2013.01)
*H04J 14/00* (2006.01)

(52) U.S. Cl.
CPC ..... *H04B 10/6163* (2013.01); *H04B 10/0795* (2013.01); *H04B 10/6162* (2013.01)

(58) Field of Classification Search
CPC .............. H04B 10/2543; H04B 10/255; H04B 10/2557; H04B 10/2563; H04B 10/6163
See application file for complete search history.

(56) References Cited

U.S. PATENT DOCUMENTS 8,744,009 B2 6/2014 Kleider et al.
8,995,835 B2 3/2015 Yan et al.
9,941,963 B2* 4/2018 Magri ............... H04B 10/25133
2015/0071652 A1 3/2015 Zhuge et al.
2015/0185046 A1 7/2015 Sobotka et al.
2016/0294480 A1 10/2016 Mertz et al.

FOREIGN PATENT DOCUMENTS

EP 2629471 A2 8/2013
EP 3096470 A1 11/2016
EP 3157180 A1 4/2017
(Continued)

OTHER PUBLICATIONS

IP, "Complexity Reduction Algorithims for Nonlinear Compensation using Digital Backpropogation", IEEE Photonics Conference 2012, TuU1, Sep. 23-27, 2012, pp. 388-389.
(Continued)

*Primary Examiner* — Daniel G Dobson
(74) *Attorney, Agent, or Firm* — Nokia Technologies Oy

(57) ABSTRACT

An apparatus includes a digital signal processor to perform perturbation-based optical nonlinearity compensation of optical data signals of a communication stream. The digital signal processor includes first digital circuits to calculate multiplicative factors for corrections to the optical data signals from products of values of the optical data signals at a reduced set of times. The reduced set is a down-sampling of the sequence of consecutive symbol times of the communication stream. The digital signal processor also includes second digital circuits to calculate the multiplicative factors for corrections to the optical data signals at the consecutive symbol times by interpolating the multiplicative factors evaluated at the reduced set of times.

21 Claims, 4 Drawing Sheets

(56) References Cited

FOREIGN PATENT DOCUMENTS

EP 3352387 A1 * 7/2018 ......... H04B 10/6163

OTHER PUBLICATIONS

Malekiha et al., "Adaptive Optimization of Quantized Perturbation Coefficients for Fiber Nonlinearity Compensation", IEEE Photonics Journal, vol. 8, No. 3, Jun. 2016, 7 pages.

IP et al., "Compensation of Dispersion and Nonlinear Impairments using Digital Backpropagation", Journal of Lightwave Technology, vol. 26, No. 20, Oct. 15, 2008, pp. 3416-3425.

Tao et al., "Multiplier-Free Intrachannel Nonlinearity Compensating Algorithm Operating at Symbol Rate", Journal of Lightwave Technology, vol. 29, No. 17, Sep. 1, 2011, pp. 2570-2576.

Oar et al., "Inter-Channel Nonlinear Interference Noise in WDM Systems: Modeling and Mitigation", Journal of Lightwave Technology, vol. 33, No. 5, Mar. 1, 2015, pp. 1044-1053.

Ghazisaeidi et al., "Calculation of Coefficients of Perturbative Nonlinear Pre-Compensation for Nyquist Pulses", the European Conference on Optical Communication (ECOC), We1.3.3, 2014, 3 pages.

Peng et al., "Training-based Determination of Perturbation Coefficients for Fiber Nonlinearity Mitigation", Optical Fiber Communications Conference and Exhibition (OFC), Th3D.2, 2015, 3 pages.

Poggiolini, "The GN Model of Non-Linear Propagation in Uncompensated Coherent Optical Systems", Journal of Lightwave Technology, vol. 30, No. 24, Dec. 15, 2012, pp. 3857-3879.

Mecozzi et al., "Nonlinear Shannon Limit in Pseudolinear Coherent Systems", Journal of Lightwave Technology, vol. 30, No. 12, Jun. 15, 2012, pp. 2011-2024.

Peddanarappagari et al., "Volterra Series Transfer Function of Single-Mode Fibers", Journal of Lightwave Technology, vol. 15, No. 12, Dec. 1997, pp. 2232-2241.

Li et al., "Electronic Post-Compensation of WDM Transmission Impairments using Coherent Detection and Digital Signal Processing", Optics Express, vol. 16, No. 2, 2008, pp. 880-888.

Savory, "Digital Filters for Coherent Optical Receivers", Optics Express, vol. 16, No. 2, 2008, pp. 804-817.

Savory et al., "Impact of Interchannel Nonlinearities on a Split-Step Intrachannel Nonlinear Equalizer", IEEE Photonics Technology Letters, vol. 22, No. 10, May 15, 2010, pp. 673-675.

Tao et al., "Complexity-Reduced Digital Nonlinear Compensation for Coherent Optical System", Proceedings Next-Generation Optical Communication: Components, Sub-Systems, and Systems II (SPIE 2013), vol. 8647, pp. 36470K1 to 86470K11.

Mecozzi et al., "Analysis of Intrachannel Nonlinear Effects in Highly Dispersed Optical Pulse Transmission", IEEE Photonics Technology Letters, vol. 12, No. 4, Apr. 2000, pp. 392-394.

* cited by examiner

US 10,756,822 B1

DIGITAL FIBER NONLINEARITY COMPENSATION

BACKGROUND

Technical Field

The invention relates to devices and methods for use in coherent optical communication.

Related Art

This section introduces aspects that may be help to facilitate a better understanding of the inventions. Accordingly, the statements of this section are to be read in this light and are not to be understood as admissions about what is prior art or what is not prior art.

In optical fiber communication systems, optical nonlinear effects often degrade optical signals thereby limiting performance. Some optical fiber communication systems have been produced with one or more digital signal processors (DSPs) to, at least partially, compensate for the degradations of the optical signal, which are caused by linear optical channel impairments. Digital compensation of degradations of the optical signal due to nonlinear optical effects may also improve the performance of an optical fiber communication system. Such digital compensation can be performed by perturbation-based optical nonlinearity compensation (PNC). Such digital compensation may diminish the need for optical signal regeneration between a source optical data transmitter and a target optical data receiver.

SUMMARY OF SOME ILLUSTRATIVE EMBODIMENTS

Some techniques for digitally compensating for degradations of optical signals, which are caused by nonlinearity optical effects, have high computational complexity and thus, are difficult to implement in the DSP(s) of an optical data transceiver and/or of an optical data receiver. Perturbation-based optical nonlinearity compensation (PNC) seems to provide such compensation with a lower computational complexity than other techniques, but PNC may still be complex for implementation in DSP(s) of coherent optical fiber communication systems. Some of the present embodiments further reduce computational complexity of DSP processing so that such compensation of degradations of optical signals due to nonlinear optical effects may be less complex and thus, may be cheaper, smaller, and/or less power hungry to digitally implement in one or more DSPs.

Various embodiments provide an apparatus including a digital signal processor to perform perturbation-based optical nonlinearity compensation of optical data signals of a communication stream. The digital signal processor includes first digital circuits to calculate multiplicative factors for corrections to the optical data signals from products of values of the optical data signals at a reduced set of times. The reduced set is a down-sampling of the sequence of consecutive symbol times of the communication stream. The digital signal processor also includes second digital circuits to calculate the multiplicative factors for corrections to the optical data signals at the consecutive symbol times by interpolating the multiplicative factors evaluated at the reduced set of times.

In the above embodiments, the multiplicative factors calculated by the first digital circuits may be convolutions of channel coefficients with sums of the products of values of the optical data signals.

In any of the above embodiments, said down-sampling may be by a factor greater than 2, 3, 4, 5, 6, 7, 8, 9, 10 or a larger integer.

In any of the above embodiments, said first digital circuits may be configured to calculate said multiplicative factors by decimating sequences of the products of values of the optical data symbols at the symbol times. In some such embodiments, the first digital circuits may combine decimation and anti-alias filtering to calculate said products of values of the optical data symbols of the reduced set.

In any of the above embodiments, the second digital circuits may be configured to calculate the multiplicative factors at the consecutive symbol times by up-sampling the multiplicative factors calculated at the reduced set of times. In some such embodiments, the second digital circuits may be configured to combine the up-sampling with digital anti-alias filtering to perform said interpolating.

In any of the above embodiments, the processor may have first digital circuits to calculate the multiplicative factors on different wavelength channels and may be configured to compensate for inter-channel nonlinear optical effects.

In first forms of any of the above embodiments, the apparatus may further include an optical data transmitter having, at least, two optical data modulators and electrical drivers thereof, and the processor may be connected to control said electrical drivers and to perform some pre-compensation of nonlinear optical effects.

In alternate second forms of any of the above embodiments, the apparatus may further include a coherent optical data receiver including optical intensity detectors and electrical hardware to provide measurements of two polarizations of the optical data signals. In such embodiments, the processor may be configured to perform some post-compensation of nonlinear optical effects.

In yet alternate third forms of any of the above embodiments, the apparatus may include an optical data transmitter and an optical data receiver to communicate over an optical fiber line. Also, the optical data transmitter may have a digital signal processor to perform some pre-compensation of optical nonlinearities in the optical fiber line, and the optical data receiver may have a digital signal processor to perform some post-compensation of optical nonlinearities in the optical fiber line.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

Herein interpolating between two boundary values can include assigning, for the interpolation, a value of one of the boundary values and can include assigning, for the interpolation, a value strictly between the boundary values. Interpolation can be performed with respect to magnitudes and/or phases.

Figure 1:
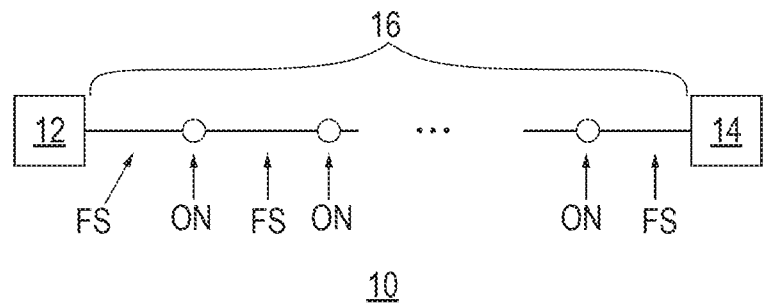
FIG. 1 schematically illustrates an optical fiber communication system that implements some digital compensation of nonlinear optical effects on optical data signals.

FIG. 1 illustrates an optical fiber communication system 10, which includes an optical data transmitter 12, an optical data receiver 14, and an optical fiber line 16. The optical fiber line 16 forms an all-optical communication channel between the optical data transmitter 12 and the optical data receiver 14. The optical fiber line 16 has one or more optical fiber spans S, e.g., single-mode optical fiber spans (FS), which are all-optically connected at optical nodes (ON). One or both of the optical data transmitter 12 and the optical data receiver 14 includes a digital signal processor (DSP), which is configured to evaluate corrections to the transmitted optical signals and to, at least, partially digitally correct for intra-channel and/or inter channel signal deformations due to nonlinear optical effects in the optical fiber line 16. The optical fiber communication system 10 may support coherent or noncoherent optical communications, e.g., based on phase and/or amplitude optical data modulation, and/or separate data modulation of orthogonal polarizations of light.

Figure 2:
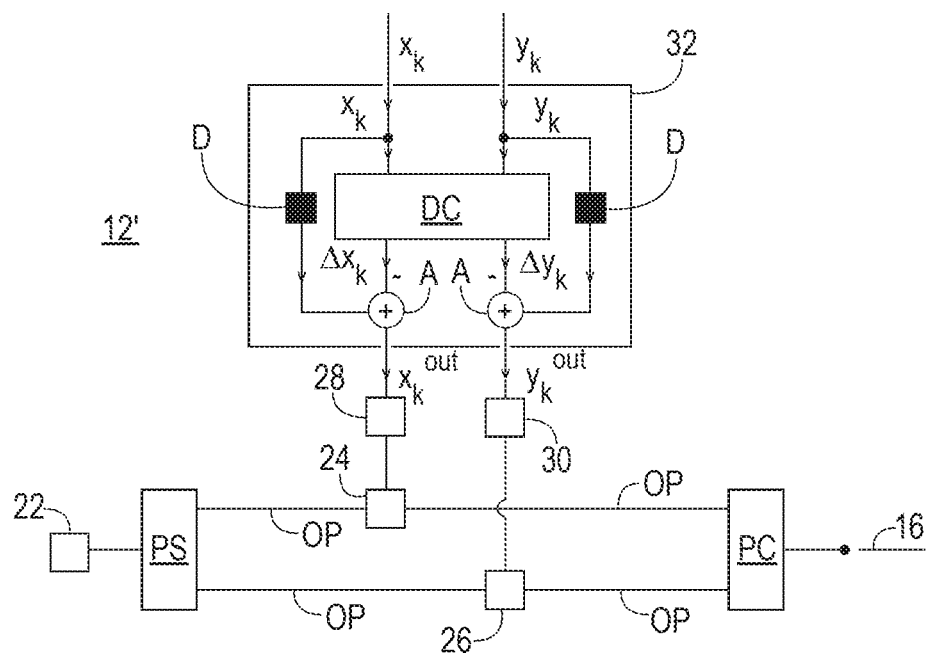
FIG. 2 is a block diagram illustrating a coherent optical data transmitter that digitally implements some pre-compensation of nonlinear optical effects in a DSP thereof.

FIG. 2 illustrates an embodiment 12' of the optical data transmitter 12 of FIG. 1, which is configured to separately data modulate both polarizations of an optical carrier and to, at least partially, digitally pre-compensate for nonlinear optical effects, e.g., in the optical fiber line 16 of FIG. 1. The optical data transmitter 12' includes an optical source 22; first and second optical data modulators 24, 26; electrical drivers 28, 30 for the optical data modulators 24, 26; and a digital signal processor (DSP) 32.

The optical source 22 is typically a narrow bandwidth, telecommunication laser. The output of the optical source 22 typically connects to an optical input of an optical polarization splitter PS whose two outputs connect via optical paths OP to optical inputs the optical data modulators 24, 26. That is, the optical source 22 is configured to send each orthogonal polarization component of an optical wavelength carrier to a different one of the optical data modulators 24, 26, e.g., via free space and/or optical waveguide type optical paths OP.

Each optical data modulator 24, 26 optically modulates a digital data stream onto the polarization component of the optical wavelength carrier received from the polarization splitter PS. For example, each optical data modulator 24, 26 may have conventional nested in-phase and quadrature-phase optical data modulators, e.g., nested Mach-Zehnder modulators, e.g., to provide for phase and/or amplitude modulation. The optical outputs of the optical data modulators 24, 26 connect to optical inputs of a polarization combiner PC via optical paths OP. The polarization combiner PC has an optical output that connects to a near end of the optical fiber line 16. The data modulated optical signals from the two optical data modulators 24, 26 are carried by orthogonal polarization states of the optical wavelength carrier at the near end of the optical fiber line 16.

Each electrical driver 28, 30 outputs an analog-voltage drive-signal to operate one of the optical data modulators 24, 26 responsive to digital control signals received from the DSP 32. In particular, each electrical driver 28, 30 converts a series of digital control signals, i.e., $x^{out}_k$, $x^{out}_{k+1}$ ... or youth, $y^{out}_k$, $y^{out}_{k+1}$ ..., from the DSP 32, into the analog-voltage drive-signals, e.g., RF signals, for operating the corresponding one of the optical data modulators 24, 26. Here, indices k, k+1, ... identify the temporal symbol or modulation slots, e.g., time slots for individual symbols-to-be-transmitted. The x-series and y-series digital control signals control the modulation of orthogonal polarization components of the optical carrier, i.e., x- and y-polarization components, from the optical source 22. In some embodiments, the drive control signals also provide for some pre-compensation of nonlinear optical effects and possibly for some pre-compensation of dispersion in the optical fiber line 16.

The DSP 32 processes the received digital symbol streams for orthogonal polarizations, i.e., $x_k$, $x_{k+1}$ ... and $y_k$, $y_{k+1}$ ... to output corresponding digital signals $x^{out}_k$, $x^{out}_{k+1}$, ... and $y^{out}_k$, $y^{out}_{k+1}$, ... that pre-compensate for some nonlinear optical effects in the optical fiber line 16. The input digital symbol streams $x_k$, $x_{k+1}$ ... and $y_k$, $y_{k+1}$ ... are already mapped, by digital demappers (not shown), to symbols of one or more selected modulation constellations, i.e., $x_k$ and $y_k$ correspond to symbols of selected constellations at symbol or modulation time slot k. From the digital symbol streams for the x-polarization and the y-polarization, i.e., $x_k$, $x_{k+1}$ ... and $y_k$, $y_{k+1}$ ..., respectively, a digital circuit DC of the DSP 32 outputs a stream of corrections, i.e., of $\Delta x_k$'s and $\Delta y_k$'s. The DSP 32 subtracts these corrections from the corresponding $x_k$ and $y_k$ digital symbols in digital adders (A) to produce output digital signals $x^{out}_k$ and $y^{out}_k$, which are, at least, partially pre-compensated for nonlinear optical deformations subsequently occurring in the optical fiber line 16. The DSP 32 also includes digital delays (D) to suitably delay the $x_k$ and $y_k$ digital symbols so that the adders A can apply corrections, i.e., $\Delta x_k$ and $\Delta y_k$, to digital signals $x_k$ and $y_k$ of the correct symbol time slot "k".

In some embodiments, the DSP 32 may also be provide for pre-compensation for some inter-channel nonlinear optical effects in the optical fiber line 16. In such embodiments, the DSP 32 and the digital circuit DC therein receives Q separate x-polarization and y-polarization digital symbol streams $x_k(1)$, $x_{k+1}(1)$, ...; $y_k(1)$, $y_{k+1}(1)$, ...; ...; $x_k(Q)$, $x_{k+1}(Q)$, ...; $y_k(Q)$, $y_{k+1}(Q)$, ..., for Q parallel, dual-polarization, wavelength channels, e.g., a dual-polarization super-channel with Q subchannels. Then, the digital circuit DC of the DSP 32 determines corrections to pre-compensate nonlinear optical effects for this group of Q optical wavelength channels. That is, the digital circuit DC of the DSP 32 calculates Q corrections, i.e., $\Delta x_k(1)$, $\Delta y_k(1)$, ..., $\Delta x_k(Q)$, $\Delta y_k(Q)$, which are subtracted from the corresponding individual digital data signals, i.e., $x_k(1)$, $y_k(1)$, ..., $x_k(Q)$, $y_k(Q)$, in 2Q digital adders A, to produce output data signals, i.e., $x_k^{out}(1)$, $y_k^{out}(1)$, ..., $x_k^{out}(Q)$, $y_k^{out}(Q)$ to, at least partially, pre-compensated for both inter-channel and intra-channel nonlinear optical effects in the optical fiber line 16.

Figure 3:
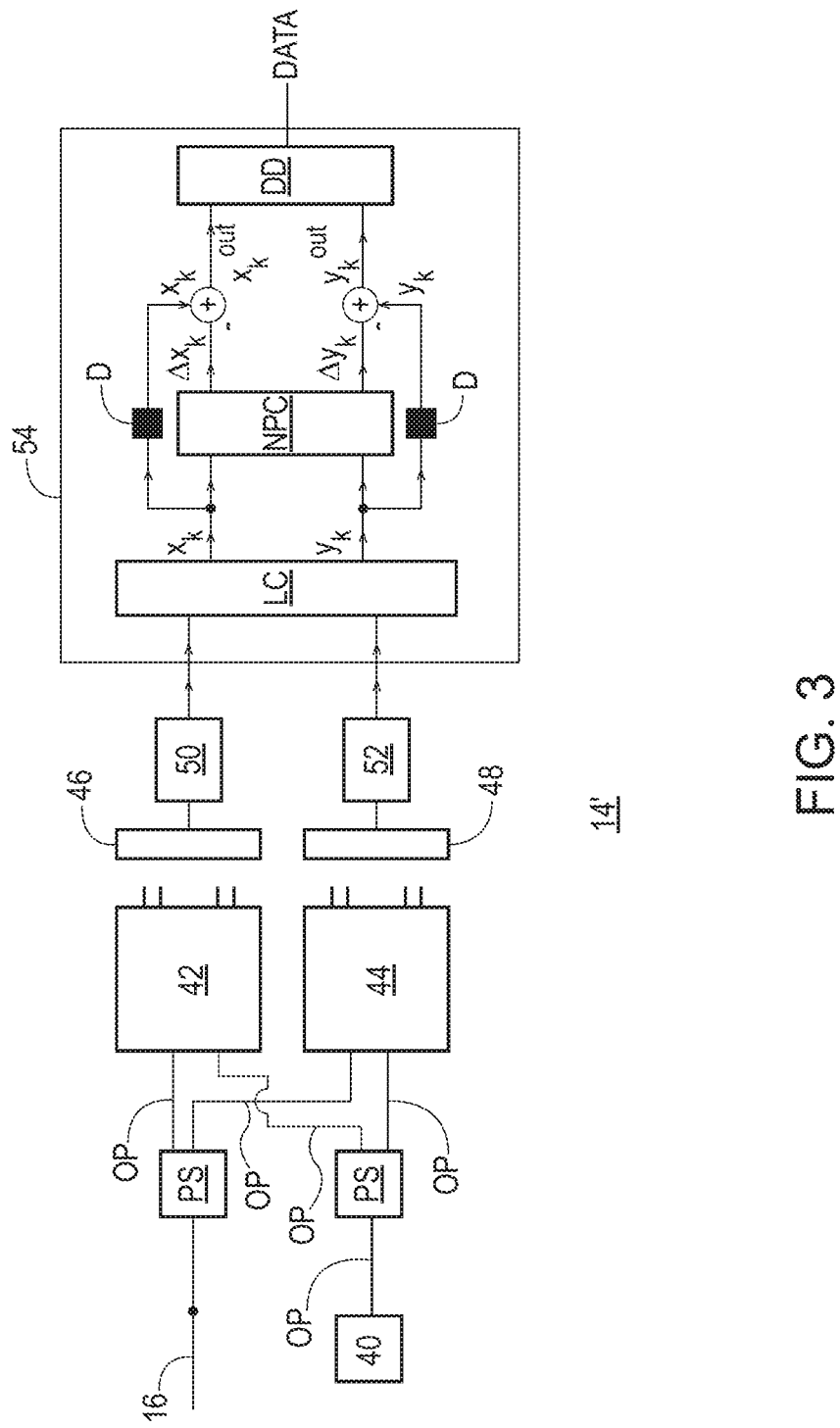
FIG. 3 is a block diagram illustrating a coherent optical data receiver that digitally implements some post-compensation of nonlinear optical effects in a DSP thereof.

FIG. 3 illustrates an embodiment 14' of the optical data receiver 14 of FIG. 1, e.g., for a coherent optical form of the optical fiber communication system 10 of FIG. 1. The optical data receiver 14' digitally post-compensates for, at least, some of the nonlinear optical effects in the all-optical fiber line 16. The optical data receiver 14 includes a local optical oscillator 40; first and second optical mixers 42, 44; optical intensity detector arrays 46, 48; two electrical hardware series 50, 52; and a DSP 54.

The local optical oscillator 40 is typically a narrow bandwidth, telecommunication laser with a wavelength near the wavelength of the optical data transmitter 12 of FIG. 1, e.g., for intradyne coherent optical detection. The local optical oscillator 40 typically transmits light to an optical polarization splitter PS via an optical path OP. The optical polarization splitter PS typically transmits the two orthogonal polarization components of said received light, via optical outputs thereof and optical paths OP, to optical inputs of the first and second optical mixers 42, 44. That is, the local optical oscillator 40 is connected to send each orthogonal polarization component of the local optical wavelength carrier to a different one of the optical mixers 42, 44.

Each optical mixer 42, 44 receives one orthogonal polarization component, i.e., x or y, of an optical signal via an optical path OP connected to an optical output of another polarization splitter PS, wherein the other polarization splitter PS is connected to receive the optical signal from the end of the optical fiber line 16 of FIG. 1. Each optical mixer 42, 44 mixes said received portion of the optical signal with light received from the local optical oscillator 40 to produce output signals indicative of phase modulations, e.g., in-phase (I) and quadrature-phase (Q) components, of a corresponding x-polarization component or y-polarization component of said received optical signal. For example, each optical mixer 42, 44 may have be a conventional 90-degree optical hybrid or a pair thereof with two inputs and two pairs of optical outputs, wherein the optical hybrid is constructed to output light mixtures, at the pairs of optical outputs, which are indicative of modulations of said I-component and Q-component of the corresponding polarization of the received optical signal.

Each optical intensity detector array 46, 48 is configured to measure optical intensities at pairs of optical outputs of one of the optical mixers 42, 44, e.g., to generate electrical signals indicative of modulations of I and Q components of a polarization component of the received optical signal. For example, each optical intensity detector array 46, 48 may include two pairs of conventional balanced photodiodes connected for differential detection of optical intensities at a corresponding pair of optical outputs of the one or more 90-degree optical hybrid(s) used for the optical mixer 42, 44.

The output of each intensity detector array 46, 48 typically connects to a conventional series 50, 52 of electrical hardware, wherein each series typically includes an electrical amplifier, an electrical low-pass filter, and an analog-to-digital converter. The series 50, 52 of electrical hardware process the measurements of the x- and y-polarization optical signals of the optical intensity detector arrays 46, 48 in ways known to those of ordinary skill in the relevant arts. For example, the low pass filters may provide filtering so that amplitudes and phases of the electrically filtered signals are indicative of the amplitudes and phases of the respective x- and y-polarization components of the optical data signals received in the optical data receiver 14'.

The DSP 54 digitally processes the x and y, digital signal streams received from the two series 50, 52 of electrical elements to recover the data symbol streams transmitted by the optical data transmitter 12 of FIG. 1. The DSP 54 typically includes a linear processing circuit (LC), e.g., to at least partially compensate for chromatic and/or polarization dispersion, polarization rotation, and/or attenuation, e.g., in the optical fiber line 16. The DSP 54 also typically includes circuitry to correct frequency offsets between the local optical oscillator 40 and the optical data signal received from the optical fiber line 16. The linear processing circuit LC outputs complex digital signal streams $x_k$, $x_{k+1}$ ... and $y_k$, $y_{k+1}$ ... for orthogonal polarization components of the optical signal for sampling time slots k, k+1, ..., e.g., for x- and y-polarization components or rotation(s) thereof.

The DSP 54 further processes the digital signal streams $x_k$, $x_{k+1}$ ... and $y_k$, $y_{k+1}$ ... to produce digital signal streams $x^{out}_k$, $x^{out}_{k+1}$ ... and $y^{out}_k$, $y^{out}_{k+1}$ ..., which are, at least partially, compensated for nonlinear optical effects in the optical fiber line 16 of FIG. 1. In particular, the DSP 54 includes a nonlinear processing circuit NPC for processing of the digital signal streams $x_k$, $x_{k+1}$ ... and $y_k$, $y_{k+1}$ ... received from the linear processing circuit LC. For the input streams of signals indicative of x- and y-polarizations, i.e., the streams of $x_k$'s and $y_k$'s, the nonlinear processing circuit NPC outputs streams of corresponding corrections, i.e., the streams of $\Delta x_k$'s and $\Delta y_k$'s. The DSP 54 also includes adders (A) that subtract these corrections $\Delta x_k$ and $\Delta y_k$ from the corresponding $x_k$ and $y_k$ digital data signals, as received from digital delays (D), to produce digital data signals $x^{out}_k$'s and $y^{out}_k$'s, at least, partially compensated for nonlinear optical effects in the optical fiber line 16.

In the DSP 54, these post-compensated digital signal streams may be further processed to recover the data symbol streams transmitted by the optical data transmitter 12 of FIG. 1. For example, the DSP 54 also may include a conventional digital decoder DD to recover said transmitted data symbols from the compensated digital data signals, i.e., the $x^{out}_k$'s and $y^{out}_k$'s. The digital decoder DD maps data symbol values back to digital data and may provide for conventional error correction, e.g., based on forward error correction related coding performed in the optical data transmitter 12 of FIG. 1.

In some embodiments, the DSP 54 may be further configured to, at least, partially, compensate for inter-channel nonlinear optical effects in the optical fiber line 16, e.g., for an optical receiver configured to receive Q separate optical wavelength channels of a super-channel transmitted by the optical data transmitter of FIG. 1. In such embodiments, the DSP 54 may receive optical signal measurements from a parallel array of Q optical front-ends, wherein each optical front-end has a form as illustrated by optical elements 40, PS, OP, 42, 44, 46, 48, 50, and 52 of the single optical front-end in FIG. 3, except that the local oscillators of the different optical front-ends output light of different wavelengths channels and that the optical fiber line 16 connects to the different optical from ends by different optical outputs of a conventional optical wavelength demultiplexer (not shown). from the linear processing circuit LC, digital signal streams $x_k(1)$, $x_{k+1}(1) \ldots , y_k(1) y_{k+1}(1) \ldots , x_k(Q)$, $x_{k+1}(Q) \ldots , y_k(Q) y_{k+1}(Q) \ldots$ , for the Q parallel transmitted, data-modulated wavelength signals, e.g., channels 1 to Q of a super-channel. The DSP 54 may be constructed to use these Q-parallel x and y streams of digital signals to evaluate corrections due to nonlinear optical effects, e.g., due to both intra-channel and inter-channel nonlinear optical effects, for this group of Q dual-polarization, optical channels. That is, the nonlinear processing circuit NPC of the DSP 54 may calculate, for each symbol or sampling time slot k, 2Q corrections, i.e., $\Delta x_k(1)$, $\Delta y_k(1), \ldots , \Delta x_k(Q), \Delta y_k(Q)$, which are subtracted, by digital adders A therein, from the corresponding individual digital data signals, i.e., $x_k(1), y_k(1), \ldots , x_k(Q), y_k(Q)$, to produce a corresponding 2Q output digital data signals, i.e., $x^{out}_k(1)$, $y^{out}_k(1), \ldots , x^{out}_k(Q), y^{out}_k(Q)$, at least partially compensating for inter-channel and intra-channel nonlinear optical effects in the optical fiber line 16.

Herein, various techniques reduce the complexity of digital evaluations of nonlinear optical effects on optical data signals in optical data transmitter 12 and/or the optical data receiver 14 of FIG. 1, e.g., in the DSP 32 of FIG. 2 and/or in the DSP 54 of FIG. 3. In particular the inventors have realized that some contributions to such nonlinear optical effects have a much lower frequency content than the digital data symbol rate. For that reason, such contributions can probably be approximated by low frequency contributions without substantial loss of accuracy to the evaluations of the nonlinear optical corrections. On the other hand, such low frequency contributions may be more simply evaluated through known techniques of digital signal processing, e.g., in the DSP 32 of the optical data transmitter 12' of FIG. 2 and/or in the DSP 54 of the optical data receiver 14' of FIG. 3.

Below, the circuits of the DSPs 32, 54 of FIGS. 2 and 3, which evaluate corrections to compensate for nonlinear optical effects, will be illustrated in more detail. One or both of the DSP 32 of FIG. 2 and the DSP 54 of FIG. 3 estimate multiplicative factors for said corrections based on a series of data for signal products at a lower rate than the sampling rate and at a lower rate than the transmission symbol rate. Indeed, the inventors have understood that the frequency spectrum, with respect to index n, of the channel-related coefficients $C_{m,n}$ PNC eqs. (2), has a much lower frequency dependence than the data sampling or data symbol frequencies, e.g., 2, 3, 4, 5, 7, 8, 9, 10 or even more times lower. For that reason, convolutions on the right-hand side of PNC eqs. (2) are likely small at higher frequencies and may be evaluated based on data at a W down-sampled rate, i.e., W may be 2, 3, 4, 5, 6, 7, 8, 9, 10 or even a larger integer. Thus, the filter functions of PNC eqs. (2) may be evaluated from data at a W down-sampled rate and then, W up-sampled to determine the multiplicative factors of said corrections, in the sums on m of the right-hand sides of PNC eqs. (2), at the data sampling or data symbol rate. Such a combination of using products of measured data signal values at a W down-sampled rate to calculate such multiplicative correction factors and then, rate-W up-sampling or interpolating said multiplicative correction factors may enable the DSP(s) 34, 52 of FIGS. 2 and/or 3 to have less complex and/or smaller and/or cheaper circuits and/or to use less power than circuits of DSPs, which evaluate the PNC eqs. (2) based on products of measured data signal values at the full sampling or symbol rate. Such a reduction of complexity, cost, size and/or power usage of circuits in the DSP(s) 32, 54 of FIGS. 2 and/or 3 may be achieved without a significant change in the quality of the digital compensation of nonlinear optical effects of the optical fiber line 16 of FIG. 1.

Figure 4:
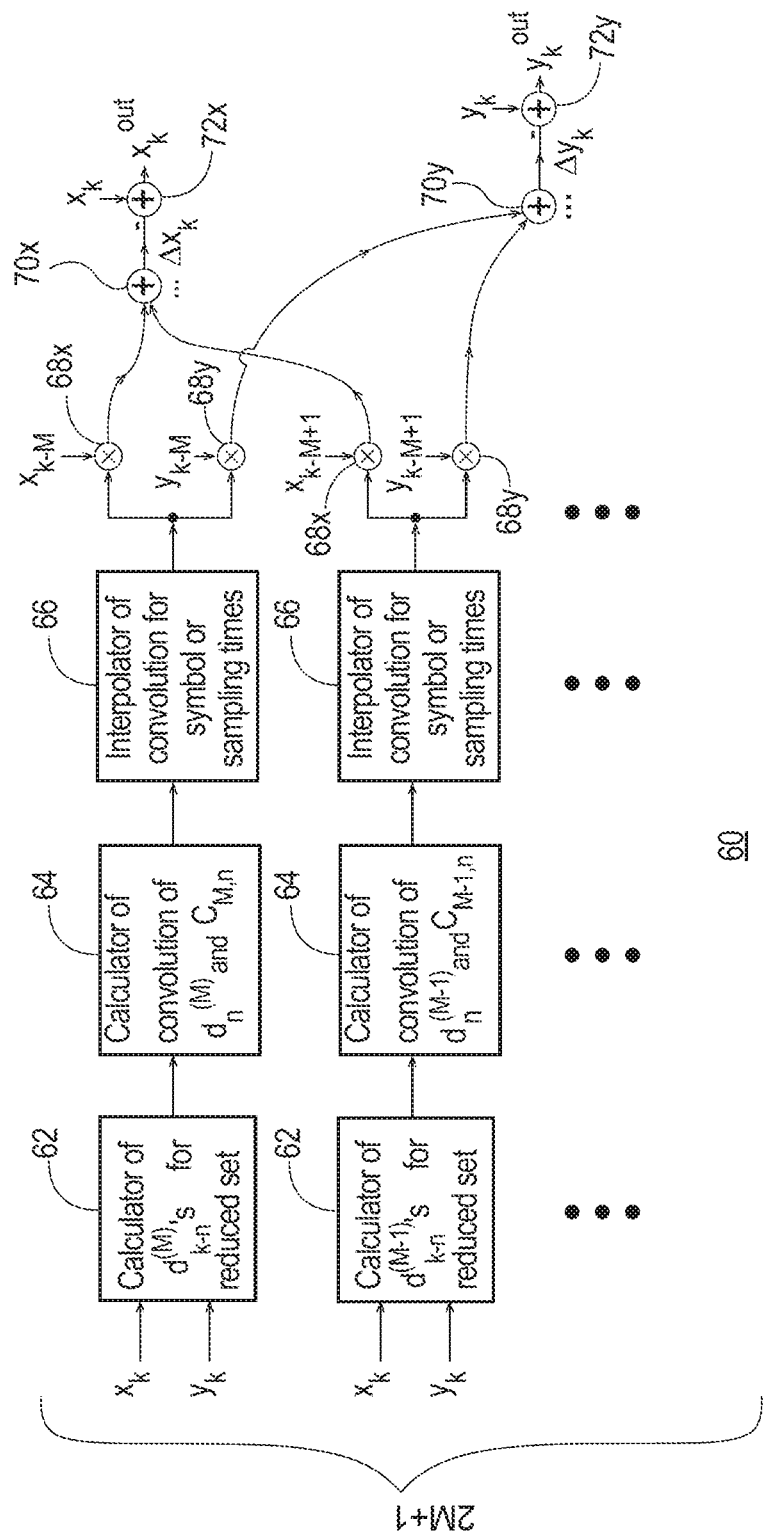
FIG. 4 schematically illustrates a method for PNC evaluation of intra-channel nonlinear optical corrections to optical data signals, e.g., for use in the DSP of the optical data transmitter of FIG. 2 and/or in the DSP of the optical data receiver of FIG. 3.
Figure 5:
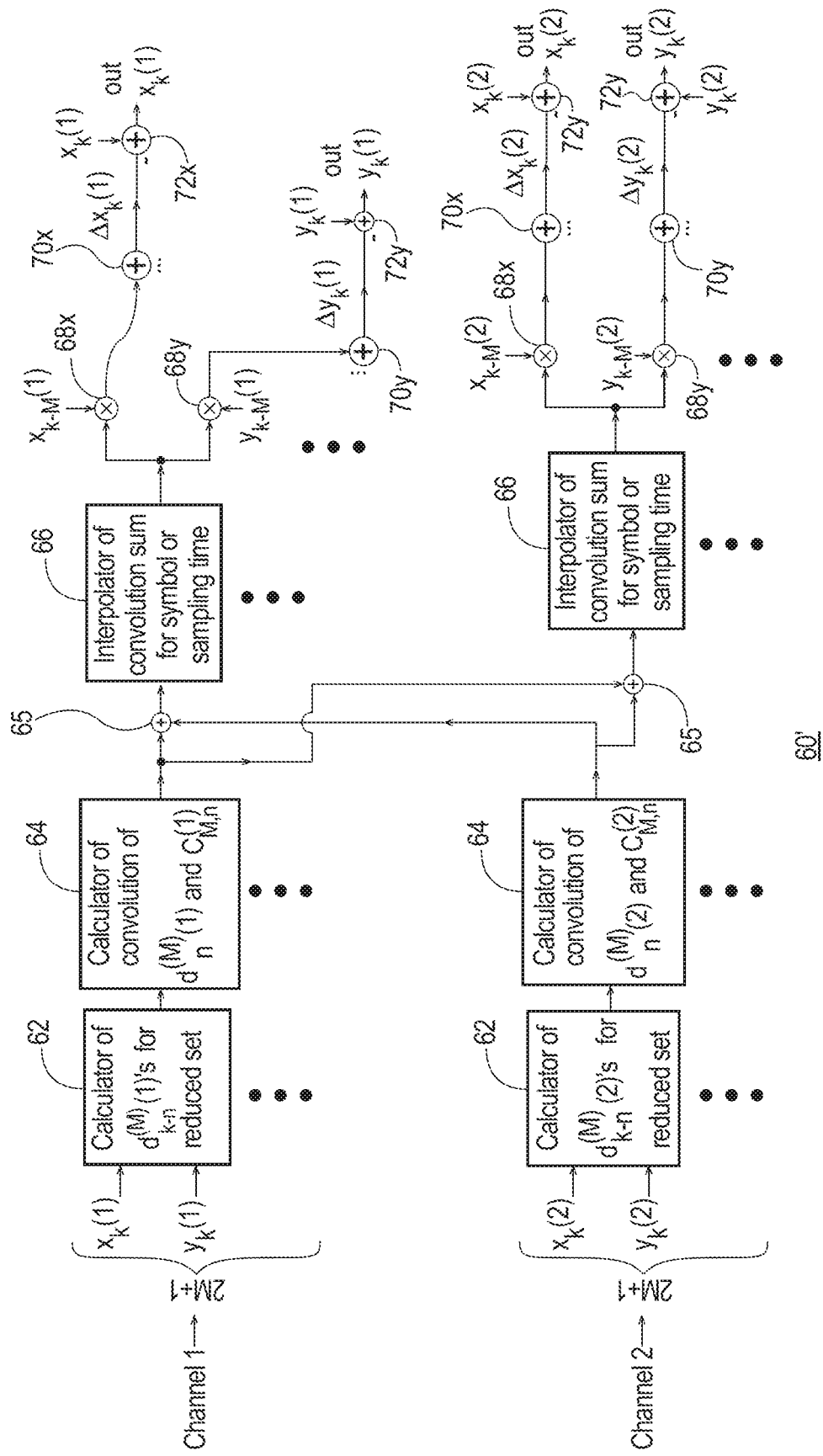
FIG. 5 schematically illustrates a method for PNC evaluation of inter-channel and intra-channel nonlinear optical corrections to optical data signals, e.g., for use in some forms of the DSP of the optical data transmitter of FIG. 3 and/or the DSP of the optical data receiver of FIG. 4.

Herein, $x_k$, $y_k$; $x^{out}_k$, $y^{out}_k$; and $\Delta x_k$, $\Delta y_k$ are used for digital signals representing x- and y-orthogonal polarization components of the optical data signal, at time slot k, in the DSPs 32, 54 of the optical data transmitter 12' of FIG. 2 and the optical data receiver 14' of FIG. 3. These quantities are defined as follows:

$x_k$, $y_k$ are values received in digital circuits for compensating nonlinear optical effects;

$x^{out}_k$, $y^{out}_k$ are optical nonlinearity compensated values output by said digital circuits; and $\Delta x_k$, $\Delta y_k$ are corrections due to nonlinear optical effects as estimated by said circuits. Various embodiments provide pre-compensation and/or post-compensation, at least partially, of nonlinear optical effects. FIG. 4 schematically illustrates a DSP circuit 60 for compensating for intra-channel nonlinear optical effects. FIG. 5 schematically illustrates a DSP circuit 60' for compensating for intra-channel and inter-channel nonlinear optical effects, e.g., in an optical super-channel embodiment of the optical communication system 10 of FIG. 1.

In FIGS. 4 and 5, various circuits implement perturbation-based optical nonlinearity compensation (PNC). The PNC technique involves digitally estimating perturbation corrections to the optical signal due intra-channel and/or inter-channel optical fiber nonlinearities. The PNC technique is used to subtract said corrections prior to modulation of the optical carrier for transmission, i.e., digital pre-compensation, and/or after receipt of the modulated optical signal, i.e., digital post-compensation. In various embodiments, such digital compensation of nonlinear optical effects can be done only in one of the DSPs 32 and 54 or can be partially done in each of the DSPs 32 and 54 of the optical data transmitter 12' and receiver 14'. While PNC technique can be performed iteratively, various embodiments may also perform single-stage compensation, e.g., in DSP 32 of the optical data transmitter 12' of FIG. 2 and/or in the DSP 54 of the optical data receiver 14' of FIG. 2. For intra-channel nonlinear optical effects, the PNC corrections of a dual polarization optical signal can be written as shown in below eqs. (1):

$$x^{out}_k = x_k + \sum_{m=-M}^{M} \sum_{n=-N}^{N} C_{m,n} x_{k-m} (x_{k-n} x^*_{k-m-n} + y_{k-n} y^*_{k-m-n}) \quad (1)$$

$$y^{out}_k = y_k + \sum_{m=-M}^{M} \sum_{n=-N}^{N} C_{m,n} y_{k-m} (x_{k-n} x^*_{k-m-n} + y_{k-n} y^*_{k-m-n}).$$

Here, $x_k$ and $y_k$ are respective x- and y-polarization, input optical data signals of the k-th symbol or sampling time slot; $x^{out}_k$ and $y^{out}_k$ are output optical data signals of the corresponding k-th output time-slot, i.e., as modified by nonlinear optical effects; and 2N+1 is the number of time slots contributing to nonlinear optical effects, e.g., due to optical dispersion. The $C_{m,n}$'s are perturbation coefficients, which depend on properties of the optical channel and are typically constant or, at worst, slowly varying in time. Here, 2M+1 is the number of time slots contributing to nonlinear optical effects, e.g., due to optical channel properties such as dispersion. The coefficients $C_{m,n}$ may be determined by training measurements on the optical fiber channel. Some suitable determinations of the $C_{m,n}$'s may be described, e.g., in the article of W. Peng et al, "Training-based Determination of Perturbation Coefficients for Fiber Nonlinearity Mitigation," published in Optical Fiber Communication Conference, OSA Digest (online) (Optical Society of America, 2015), paper Th3D.2, and/or in the article of A. Ghazisaeidi et al, "Calculation of coefficients of perturbative nonlinear pre-compensation for Nyquist pulses", published in Technical digest of European Conference on Optical Communication (2014) paper We. 1.3.3. Both articles, which are mentioned in this paragraph, are incorporated herein, by reference, in their entirety.

PNC eqs. (1) can be rewritten as filtering equations with a signal-dependent filter function:

$$x_k^{out} = x_k + \sum_{m=-M}^{M} x_{k-m} \left[ \sum_{n=-N}^{N} C_{m,n} d_{k-n}^{(m)} \right]$$

$$y_k^{out} = y_k + \sum_{m=-M}^{M} y_{k-m} \left[ \sum_{n=-N}^{N} C_{m,n} d_{k-n}^{(m)} \right].$$
(2)

In the PNC eqs. (2), the square-bracketed terms are effective "filter" coefficients, and data signal products $d^{(m)}_{k-n}$'s are defined as:

$$d_{k-n}^{(m)}(x_{k-n} x^*_{k-m-n} + y_{k-n} y^*_{k-m-n})$$
(3).

Various embodiments perform PNC-based compensation with reduced computational complexity, fabrication cost, hardware footprint, and/or power, and the lower complexity, fabrication cost, hardware footprint, and/or power usage relates to a lower number of arithmetic calculations performed than in other techniques for PNC-based compensation of nonlinear optical effects.

In PNC eqs. (2), it was discovered that the calculations associated with the sums over "m" and "n" of the square-bracketed terms, i.e., the convolutions, could be reduced. In particular, such sums can be reduced to sums over strips about the m=0 and n=0 axes. This technique of calculating the convolutions is described, e.g., in European Patent Publication No. 3157180, which is incorporated herein by reference in its entirety. Unfortunately, in some situations, this simplification may still leave the remaining calculations of PNC corrections to be complex, costly, and/or power hungry.

Recently, the inventors studied the properties of filter functions of the right-hand sides of the PNC eqs. (2), i.e., the convolutions. For various values of index m, the inventors found that the channel-based coefficients $C_{m,n}$ seem have a much lower frequency spectrum, than the x and y data signals. Thus, high frequency components of the coefficients $C_{m,n}$ seem to be only rarely relevant to calculations of the convolutions of the square brackets on the right-hand side of the PNC eqs. (2). That is, high frequency components of the coefficients $C_{m,n}$ may not be needed to accurately evaluate corrections to the x and y optical signals. Also, the convolutions may vary slowly in index k. Such observations seem to imply that the PNC eqs. (2) may be simplified. The embodiments of apparatus 60, 60' of FIGS. 4 and 5 modify the evaluation of corrections for such forms of the PNC eqs. (2) by ignoring high frequency contributions to the evaluations of the filter functions, i.e., by ignoring such contributions to the multiplicative correction factors defined by convolutions of the square brackets in the PNC eqs. (2). In particular, the embodiments estimate the convolutions of the square brackets on the right-hand side of PNC eqs. (2) based on data at a lower rate than the symbol or sampling rate of the optical signals $x_k$ and $y_k$. For example, the temporal rate for such terms of the n-type sums of the convolutions may be W times lower than the data symbol or sampling rate or optical data signals, where W is an integer such as 2, 3, 4, 5, 6, 7, 8, 9, 10 or even is a larger integer. This effective lower rate reduces the number of terms of such n-type sums in the convolutions of PNC eqs. (2) for direct calculation, e.g., from (2N+1) to about (2N+1)/W terms, whether the convolutions are calculated by evaluating such sums in time or momentum space. Then, values of the convolutions from other values of index "k" may be determined by interpolation, e.g., due to the lower frequency content of the coefficients $C_{m,n}$ with respect to frequencies related to the index n and a slow variation of the convolutions in index "k". Thus, the evaluation of PNC-based corrections are typically simplified in the digits circuits or apparatus 60, 60' of FIGS. 4 and 5.

FIG. 4 illustrates an apparatus 60 for digitally evaluating and compensating intra-channel nonlinear optical effects, e.g., in the DSP 32 of FIG. 2 and/or the DSP 54 of FIG. 3.

The apparatus 60 includes a parallel array of [2M+1] circuits. Each circuit of the array obtains the estimated contribution to the right-hand side of the PNC eqs. (2) for a corresponding term of the sum over index m. Here, m is an integer of interval [−M, +M], but for clarity, only two circuits of the parallel array, i.e., for m=M and m=M−1, are explicitly shown in FIG. 4.

For each member of the parallel array and corresponding value of m, the apparatus 60 includes a digital calculator circuit 62 to determine the data signal products $d^{(m)}_{k-n}$'s of the PNC eqs. (2) and (3) for a reduced set of symbol or sampling slots, e.g., a reduced set of values "k−n". The reduced set is W-down-sampled over the symbol or sampling time slot and includes about [2N+1]/W of the [2N+1] consecutive sampling or symbol time slots in the PNC eqs. (2) and (3), i.e., about 1/W of the values therein. The reduced set may be evenly distributed among the appropriate sequence of [2N+1] consecutive values of k. Thus, W-down-sampling has a rate of 1/W times the data symbol or data sampling rate where W may be 2, 3, 4, 5, 6, 7, 8, 9, 10 or a larger integer.

The reduced set of values of the data signal products $d^{(m)}_{k-n}$'s may be determined in various ways.

First, the reduced set of the data signal products $d^{(m)}_{k-n}$'s may be directly calculated from eq. (3), i.e., $d^{(m)}_{k-n} = x_{k-n} \cdot x^*_{k-n-m} + y_{k-n} \cdot y^*_{k-n-m}$, and from the received stream of x and y digital data signal values for the reduced set of data symbol or sampling time slots.

Second, the reduced set of data signal products $d^{(m)}_{k-n}$ may be calculated from eq. (3), i.e., $d^{(m)}_{k-n} = x_{k-n} \cdot x^*_{k-n-m} + y_{k-n} \cdot y^*_{k-n-m}$, for each data symbol or sampling time slot and then, W-down-sample to obtain the reduced set of data signal products $d^{(m)}_{k-n}$. The W-down-sampling may combine digital anti-alias filtering and rate-W decimation of the stream of data signal products $d^{(m)}_{k-n}$ for consecutive data symbol or sampling time slots k. An example of the anti-aliasing digital filtering may use a low pass filter P(z) of the form $[(1-z^{-W})/(1-z^{-1})]^P$ with P=1, 2, 3, or a larger integer. Such anti-alias digital filtering may be followed by rate-W decimation of the the P(z) filtered digital stream of data signal products $d^{(m)}_{k-n}$. Alternately, such down-sampling may be performed digital filtering the stream of data signal products $d^{(m)}_{k-n}$ for consecutive symbol or sampling slots k with a digital filter $[1/(1-z^{-1})]^P$, rate-W decimating the digital filtered stream, and then, filtering the rate-W decimated stream with another digital filter of the form $[(1-z^{-W})]^P$.

For each member of the parallel array and corresponding value of m, the apparatus 60 includes a digital calculator circuit 64 for calculating the convolution of PNC eqs. (2), for data signal products $d^{(m)}_{k-n}$ with the coefficients $C_{m,n}$ over the reduced set of data symbol or sampling time slots. The reduced set includes about 1/W of the integer valued time slots n in the relevant interval, e.g., [k+N, k−N], out of the (2N+1) such time slots for values of index n. Due to the use of a reduced set of said data symbol or sampling time slots, the digital circuit 64 may be less complex, be less costly, have a smaller footprint and/or use less energy than conventional circuits for evaluating said convolution of the PNC eqs. (2) with the full sums on the index n.

For various embodiments, the inventors realized that the form of coefficients $C_{m,n}$ typically enables a simpler evaluation of the convolutions of the right-hand sides of the PNC eqs. (2), i.e., by performing sums on index n over a W-down-sampled subset of the integers in the interval [−N, +N]. In particular, for various values of m, the coefficients $C_{m,n}$ seem to have a frequency spectrum, with respect to n, which is 1/W times narrower than the frequency spectrum of the digital data signals $x_n$ and $y_n$. For this reason, the high frequency part of the spectrum of the coefficients $C_{m,n}$ likely rarely contributes to the convolutions of the PNC eqs. (2). Thus, the removal of the high frequency spectrum of the coefficients $C_{m,n}$ and the data signal product values $d^{(m)}_n$ from the sums over n is not expected to significantly change the values of the convolutions of the PNC eqs. (2). For this reason, various embodiments use a W-down-sampled n-series of the data signal product values $d^{(m)}_n$'s and a W-down-sampled n-series of the coefficients $C_{m,n}$, which simplifies the calculations of the PNC corrections to digital data signals $x_n$ and $y_n$.

Each digital calculator circuit 64 for calculating a convolution of the PNC eqs. (2) may evaluate the convolution as a discrete time series or evaluate the convolution in a discrete momentum space with respect to index n. With respect to the discrete time series evaluation of the convolution, the reduced size of the sum in index n may provide a reduction in the size of finite-impulse-response of the equalizer for said evaluations, e.g., a reduction by a factor of about W of the number of taps of the equalizer. Such forms of the digital calculator circuit 64 may or may not also incorporate the summing simplifications described, e.g., in European Patent Publication No. 3157180. With respect to a discrete momentum space evaluation of the convolution, each convolution is evaluated as an inverse discrete Fourier transform of a product of discrete inverse Fourier transforms the data signal product values $d^{(m)}_n$ and the coefficients $C_{m,n}$. The discrete Fourier and discrete inverse Fourier transforms are over appropriate about W-reduced spaces of values, i.e., of dimension about [2N+1]/W. The discrete Fourier and inverse Fourier transforms may be evaluated by conventional techniques, e.g., fast Fourier transforms and fast inverse Fourier transforms. Both the time and momentum space forms of the digital circuits of the apparatus 60 can be considerably simplified and/or use less power due to such reductions of sizes of sums.

Whereas the previously described digital circuits obtain values of the convolutions of the PNC eqs. (2) for the reduced set of data symbol or sampling time slots, the digital signals for the x and y polarizations take values at each data symbol or sampling time slot k and need correction at each such data symbol or sampling time slot. Thus, for each member of the parallel array and corresponding value of m, the apparatus 60 includes a digital interpolator circuit 66 for estimating the convolution for each data symbol or sampling time slot by interpolating based on the convolutions calculated by the digital circuit 64 for the reduced set of data symbol or sampling time slots. For example, the time slots between two time slots of the reduced set may be assigned the convolution value of one of said two time slots. Alternately, the digital interpolation may include, e.g., performing rate-W digital up-sampling on the time series of calculated convolutions from the digital circuit 64, i.e., for the reduced set, combined with digital anti-alias filtering thereof. The digital anti-aliasing filter can have the same or similar form to a digital anti-aliasing filter used by the digital calculation circuit 62.

For each member of the parallel array and corresponding value of m, the apparatus 60 includes a pair of digital multiplier circuits $68_x$, $68_y$, which separately weights each estimate of a convolution from the digital interpolator circuit 66 by a digital measure of the x-polarization signal or the y-polarization signal, at appropriate time slots, to obtain the corrections as shown on the right-hand sides of the PNC eqs. (2). To obtain the index m correction to $x_k$ and $y_k$, the convolution of time slot k is multiplied by $x_{k-m}$ and $y_{k-m}$, respectively, according to PNC eqs. (2). Said multiplying steps produce [2M+1] separate corrections for each polarization component, i.e., x and y, and for each data symbol or sampling time slot k of the digital data signal.

The apparatus 60 includes x digital adder circuit 70 and y digital multiplier circuit $70_y$, which separately add the corrections from the 2M+1 digital multiplier circuits 68 of the parallel array for the respective x- and y-polarizations. The digital adder circuits $70_x$ and $70_y$ add the corrections for the respective x- and y-polarizations, from the parallel arrays of 2M+1 digital multiplier circuits 68, to thereby obtain $\Delta x_k$ and $\Delta y_k$, respectively.

Finally, the apparatus 60 may include separate x and y digital subtractors $72_x$ and $72_y$, respectively, which subtract $\Delta x_k$ from $x_k$ and subtract $\Delta y_k$ from $y_k$, respectively, to obtain $x^{out}_k$ and $y^{out}_k$. Here, the signals $70_x$, $70_y$ represent digital x- and y-polarization data signals that are, at least partially, compensated for intra-channel nonlinear optical degradation.

FIG. 5 schematically illustrates an apparatus 60' for digitally compensating both inter-channel and intra-channel nonlinear optical effects, e.g., in the DSP 32 of FIG. 2 and/or the DSP 54 of FIG. 3. The apparatus 60' is configured to correct for inter-channel and intra-channel nonlinear optical effects for 2 interacting wavelength channels, e.g., propagating through the same optical fiber line 16 of FIG. 1. But, the person of ordinary skill in the relevant arts would understand how to modify the apparatus 60' to cover other embodiments with more than two interacting wavelength channels based on the teachings of the present application.

The apparatus 60' receives x- and y-polarization digital signals $x_k(1)$ and $y_k(1)$ in the first wavelength channel and x- and y-polarization digital signals $x_k(2)$ and $y_k(2)$ in the second wavelength channel. Also, each wavelength channel has an associated set of channel coefficients, i.e., $C_{m,n}(1)$ and $C_{m,n}(2)$ and an associated set of data signal product values, i.e., $d^{(m)}_n(1)$ and $d^{(m)}_n(2)$.

For each wavelength channel, i.e., channels 1 and 2, the apparatus 60' includes a separate parallel array of [2M+1] digital calculator circuits 62 for data signal products, digital calculator circuits 64 for convolutions, digital interpolator circuits 66, and paired x- and y-polarization multiplier circuits $68_x$, $68_y$, which operate as explained for the apparatus 60 of FIG. 4. Also, for each wavelength channel, the apparatus 60' includes paired x- and y-polarization digital adder circuits $70_x$, $70_y$ and paired digital subtractor circuits $72_x$, $72_y$, which operate as already explained for the apparatus 60 of FIG. 4.

In addition, the apparatus 60' includes another digital adder circuit 65 in each wavelength channel for each of the [2M+1] values of the index m. Each adder circuit 65 adds the evaluations of the convolutions for both wavelength channels in each data symbol or sampling time slot, i.e., for the same values of m. Thus, each adder circuit 65 adds together the inter-channel and intra-channel contributions to the convolutions on the right-hand side of PNC eqs., which are similar to eqs. (2) except that the new PNC eqs. add inter-channel contributions to the convolutions of eqs. (2) and include a set of such similar eqs. for each wavelength channel.

From the disclosure, drawings, and claims, other embodiments of the invention will be apparent to those skilled in the art.

What is claimed is:

1. An apparatus, comprising:
a digital signal processor to perform perturbation-based optical nonlinearity compensation of optical data signals of a communication stream;
wherein the processor comprises first digital circuits to calculate multiplicative factors for corrections to the optical data signals from products of values of the optical data signals at a reduced set of times, the reduced set being a down-sampling of the sequence of consecutive symbol times of the communication stream, and the processor comprises second digital circuits to calculate the multiplicative factors for corrections to the optical data signals at the consecutive symbol times by interpolating the multiplicative factors calculated at the reduced set of times.

2. The apparatus of claim 1, wherein the multiplicative factors calculated by the first digital circuits are convolutions of channel coefficients with sums of the products of values of the optical data signals.

3. The apparatus of claim 1, wherein said down-sampling is by a factor greater than two.

4. The apparatus of claim 1, wherein said first digital circuits are configured to calculate said multiplicative factors by decimating sequences of the products of values of the optical data symbols at the symbol times.

5. The apparatus of claim 4, wherein the first digital circuits combine decimation and anti-alias filtering to calculate said products of values of the optical data symbols of the reduced set.

6. The apparatus of claim 4, wherein said down-sampling is by a factor greater than two.

7. The apparatus of claim 1, wherein the second digital circuits are configured to calculate the multiplicative factors at the consecutive symbol times by up-sampling the multiplicative factors calculated at the reduced set of times.

8. The apparatus of claim 7, wherein the second digital circuits combine the up-sampling with digital anti-alias filtering to perform said interpolating.

9. The apparatus of claim 1, wherein the processor has first digital circuits to calculate the multiplicative factors on different wavelength channels and is configured to compensate for inter-channel nonlinear optical effects.

10. The apparatus of claim 9, wherein the multiplicative factors calculated by the first digital circuits are convolutions of channel coefficients with sums of the products of values of the optical data signals.

11. The apparatus of claim 9, wherein said first digital circuits are configured to calculate said products by decimating sequences of the products at the symbol times.

12. The apparatus of claim 9, wherein the second digital circuits are configured to calculate the multiplicative factors at the consecutive symbol times by up-sampling the multiplicative factors calculated at the reduced set of times.

13. The apparatus of claim 9, wherein said down-sampling is by a factor greater than two.

14. The apparatus of claim 1, further comprising an optical data transmitter including two optical data modulators and electrical drivers thereof; and wherein the processor is connected to control said electrical drivers and to perform some pre-compensation of nonlinear optical effects.

15. The apparatus of claim 14, wherein the multiplicative factors calculated by the first digital circuits are convolutions of channel coefficients with sums of the products of values of the optical data signals.

16. The apparatus of claim 14, wherein said down-sampling is by a factor greater than two.

17. The apparatus of claim 14, wherein the processor has first digital circuits to calculate the multiplicative factors on different wavelength channels and is configured to compensate for inter-channel nonlinear optical effects.

18. The apparatus of claim 1, further comprising a coherent optical data receiver including optical intensity detectors and electrical hardware to provide measurements of two polarizations of the optical data signals and wherein the processor is configured to perform some post-compensation of nonlinear optical effects.

19. The apparatus of claim 18, wherein said down-sampling is by a factor greater than two.

20. The apparatus of claim 18, wherein the multiplicative factors calculated by the first digital circuits are convolutions of channel coefficients with sums of the products of values of the optical data signals.

21. The apparatus of claim 18, wherein the processor has first digital circuits to calculate the multiplicative factors on different wavelength channels and is configured to compensate for inter-channel nonlinear optical effects.

* * * * *